United States Patent
Krumel et al.

(10) Patent No.: US 7,401,132 B1
(45) Date of Patent: Jul. 15, 2008

(54) METHOD AND SYSTEM FOR CREATING A PEER-TO-PEER OVERLAY NETWORK

(75) Inventors: Andrew Krumel, San Jose, CA (US); Paul L. Borrill, Palo Alto, CA (US); Paul Czarnik, Danville, CA (US); Gregory L. Slaughter, Palo Alto, CA (US); John Muth, Scotts Valley, CA (US); Girish Jorapurkar, Pune (IN)

(73) Assignee: Symantec Operating Corporation, Cupertino, CA (US)

(*) Notice: Subject to any disclaimer, the term of this patent is extended or adjusted under 35 U.S.C. 154(b) by 828 days.

(21) Appl. No.: 10/327,545

(22) Filed: Dec. 20, 2002
(Under 37 CFR 1.47)

(51) Int. Cl.
*G06F 15/16* (2006.01)
*G06F 15/173* (2006.01)
*H04L 12/28* (2006.01)
*H04L 12/56* (2006.01)

(52) U.S. Cl. .................. 709/220; 709/238; 709/227; 370/351; 370/408

(58) Field of Classification Search .................. None
See application file for complete search history.

(56) References Cited

U.S. PATENT DOCUMENTS

| | | | | | |
|---|---|---|---|---|---|
| 4,967,345 | A | * | 10/1990 | Clarke et al. | 709/241 |
| 5,321,815 | A | * | 6/1994 | Bartolanzo et al. | 709/241 |
| 5,752,241 | A | * | 5/1998 | Cohen | 707/3 |
| 6,275,470 | B1 | * | 8/2001 | Ricciulli | 370/238 |
| 6,421,434 | B1 | * | 7/2002 | Rosu | 379/133 |
| 6,502,135 | B1 | * | 12/2002 | Munger et al. | 709/225 |
| 6,611,872 | B1 | | 8/2003 | McCanne | |
| 6,697,751 | B2 | * | 2/2004 | Skingsley et al. | 702/108 |
| 6,704,320 | B1 | * | 3/2004 | Narvaez et al. | 370/408 |
| 6,763,389 | B2 | * | 7/2004 | Kryskow, Jr. | 709/229 |
| 6,961,794 | B2 | * | 11/2005 | Atherton et al. | 710/301 |
| 7,012,893 | B2 | * | 3/2006 | Bahadiroglu | 370/231 |
| 2002/0171884 | A1 | * | 11/2002 | Yang | 359/110 |
| 2002/0184311 | A1 | | 12/2002 | Traversat et al. | |
| 2003/0208621 | A1 | * | 11/2003 | Bowman | 709/242 |
| 2004/0003285 | A1 | * | 1/2004 | Whelan et al. | 713/201 |

(Continued)

OTHER PUBLICATIONS

Stoica et al: Chord: A Scalable Peer-to-Peer Lookup Service for Internet Applications; MIT Laboratory for Computer Science, Aug. 2001.

(Continued)

*Primary Examiner*—Bunjob Jaroenchonwanit
*Assistant Examiner*—Angela Widhalm
(74) *Attorney, Agent, or Firm*—Moser IP Law Group

(57) ABSTRACT

A method and system for creating a peer-to-peer overlay network. The method includes discovering a set of node characteristics for each of a subset of existing nodes of a network. The method also includes scaling each of the discovered set of node characteristics to a value which is within a predetermined range of values. The method also includes generating a set of weighted values for each of the subset of nodes by applying a weighting function to each of the scaled values. In addition, the method includes generating a node rank value for each of the subset of nodes by summing the weighted values of each respective set of weighted values. Further, the method includes determining whether to connect to any of the subset of nodes based upon the node rank value.

28 Claims, 6 Drawing Sheets

U.S. PATENT DOCUMENTS

2004/0107219 A1* 6/2004 Rosenberger ............ 707/104.1
2006/0212276 A1* 9/2006 Drumheller .................... 703/1
2006/0230134 A1* 10/2006 Qian et al. .................. 709/224

OTHER PUBLICATIONS

Rowstron et al: Pastry: Scalable, Decentralized Object Location and Routing for Large-Scale Peer-to-Peer Systems; Nov. 2001.

Jordan Ritter: Why Gnutella Can't Scale. No, Really.; Feb. 2001.

Roussopoulos et al.: CUP: Controlled Update Propagation in Peer-to-Peer Networks; Feb. 2002.

Ian Clarke: A Distributed Decentralised Information Storage and Retrieval System; 1999.

Traversat, et al, "Project JXTA Virtual Network", Feb. 05, 2002, http://www.jxta.org/docs/JXTAprotocols.pdf.

* cited by examiner

METHOD AND SYSTEM FOR CREATING A PEER-TO-PEER OVERLAY NETWORK

BACKGROUND OF THE INVENTION

1. Field of the Invention

This invention relates to distributed computer networks and, more particularly, to peer-to-peer overlay network creation.

2. Description of the Related Art

Distributed computing has become increasingly popular as the capabilities of the Internet have begun to be realized. Particularly, peer-to-peer (p2p) networking has seen rapid growth. As used herein, a peer-to-peer network is generally used to describe a decentralized network of peer nodes where each node may have similar processing capabilities. Further and in contrast to a traditional client-server network, participating peers in a P2P network may communicate directly with each other. Work may be done and information may be shared through interaction between the peers. In addition, in a p2p network, a given peer node may be equally capable of serving as either a client or a server.

The Internet may be thought of as an underlying network of potential nodes interconnected via an Internet protocol (IP). For example, one such protocol is a transport control protocol/Internet protocol (TCP/IP) protocol, where any connected node may talk to any other connected node. Another example may be a user datagram protocol/Internet protocol UDP/IP. For various reasons, a given p2p network may be created having a subset of all the interconnected nodes. This subset of nodes may be referred to as an overlay network. This network behavior may be true for other types of networks as well. FIG. 1 illustrates a system diagram of multiple nodes interconnected via a p2p network. The system includes multiple nodes 20A-E physically interconnected through a network 10. As described above, each of nodes 20A-E may communicate directly with each other node.

In addition, an overlay network need not necessarily have the same topology as the underlying physical connections. For example, if a network includes three nodes connected such that a first node is connected to a second node which is connected to a third node, the overlay may show the network as the first node connected to the third node. This may be possible since a TCP/IP connection may be made between any two nodes.

The overlay network may be created to fulfill some specific need or it may be created as a general-purpose network. Overlay networks may also be created to enhance network manageability or to ensure that only trusted nodes are included in the subset. For example, many p2p networks are created to deliver one type of service and thus typically run one application. For example, Napster was created to enable users to share music files, while Gnutella was created for general-purpose file sharing. Examples of early versions of p2p networks are USENET and FidoNet®. These decentralized applications were primarily for newsgroups and messaging among peers, respectively. However, p2p networks are not limited to file sharing or messaging applications. Some p2p networks may be used for distributed computing and distributed information storage. FIG. 2 illustrates another system diagram showing multiple nodes interconnected via a p2p network. This system includes multiple nodes 10A-E physically interconnected through a network 100. However, a subset of the nodes are communicating with one another via a peer-to-peer overlay network 150.

Each network may exhibit certain characteristics such as communication latency, for example. The intended use of a particular overlay network may dictate which network characteristics may be desirable. Once the desirable characteristics have been identified, choosing which subset of nodes each node connects to may determine the structure and characteristics that a given overlay network may exhibit. Depending on the criteria used to interconnect the nodes, the network may become unmanageable or inflexible and in a worst case, inoperable. There are many overlay network applications available and each has advantages and disadvantages. In some overlay networks, a node may join a particular network based on similar interests. Other overlay networks may make use of a random walk of all nodes in the network. Still others may employ mathematical methods using node IDs. However it may be difficult to build a p2p overlay network having certain desirable characteristics without the use of a central server or without global network state knowledge.

SUMMARY OF THE INVENTION

Various embodiments of a method and system for creating a peer-to-peer overlay network are disclosed. In one embodiment, the method includes discovering a set of node characteristics for each of a subset of existing nodes of a network. The method also includes scaling each of the discovered set of node characteristics to a value which is within a predetermined range of values. The method also includes generating a set of weighted values for each of the subset of nodes by applying a weighting function to each of the scaled values. In addition, the method includes generating a node rank value for each of the subset of nodes by summing the weighted values of each respective set of weighted values. Further, the method includes determining whether to connect to any of the subset of nodes based upon the node rank value.

Figure 1:
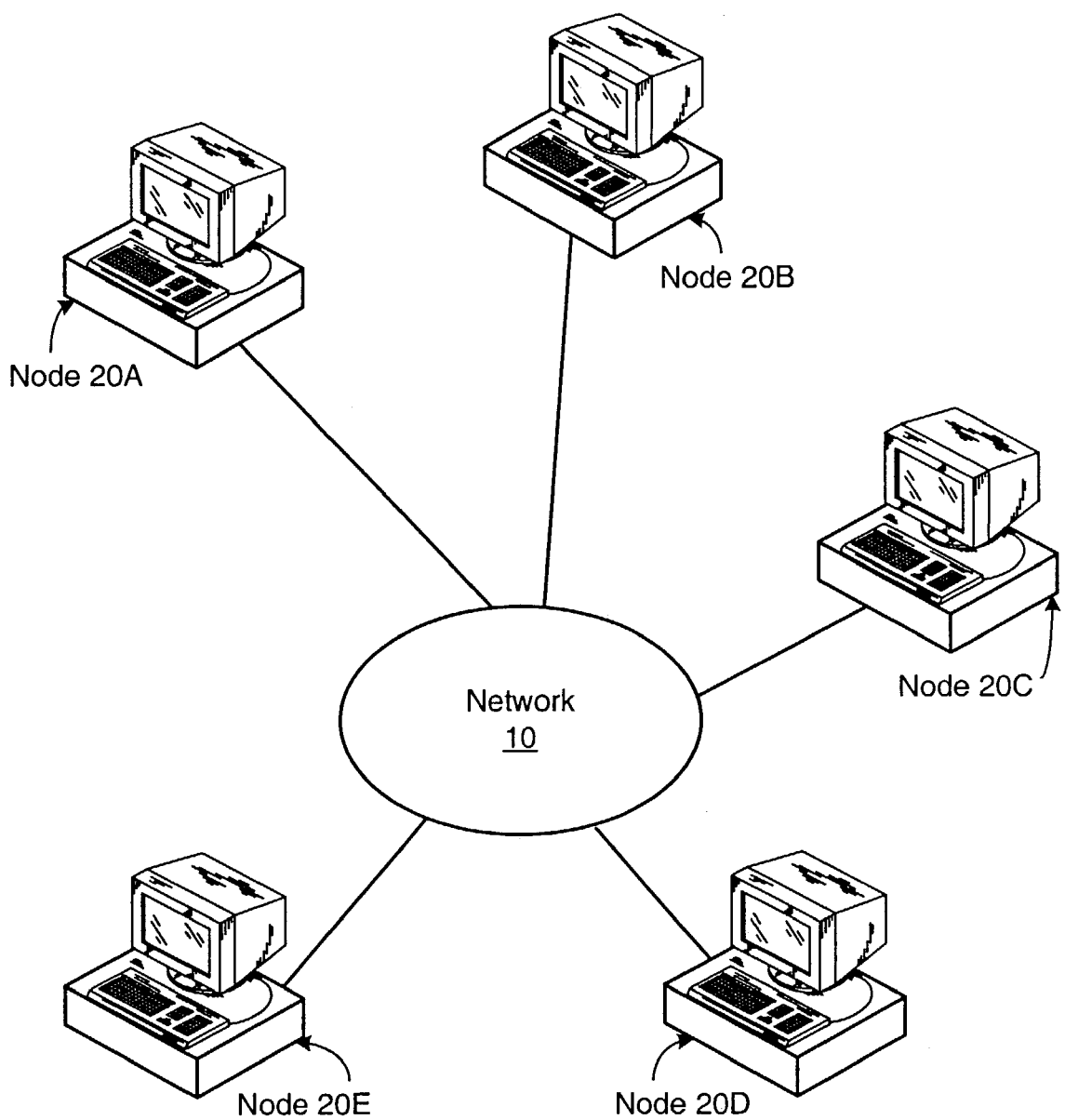
FIG. 1 is a diagram of a prior art peer-to-peer network.
Figure 2:
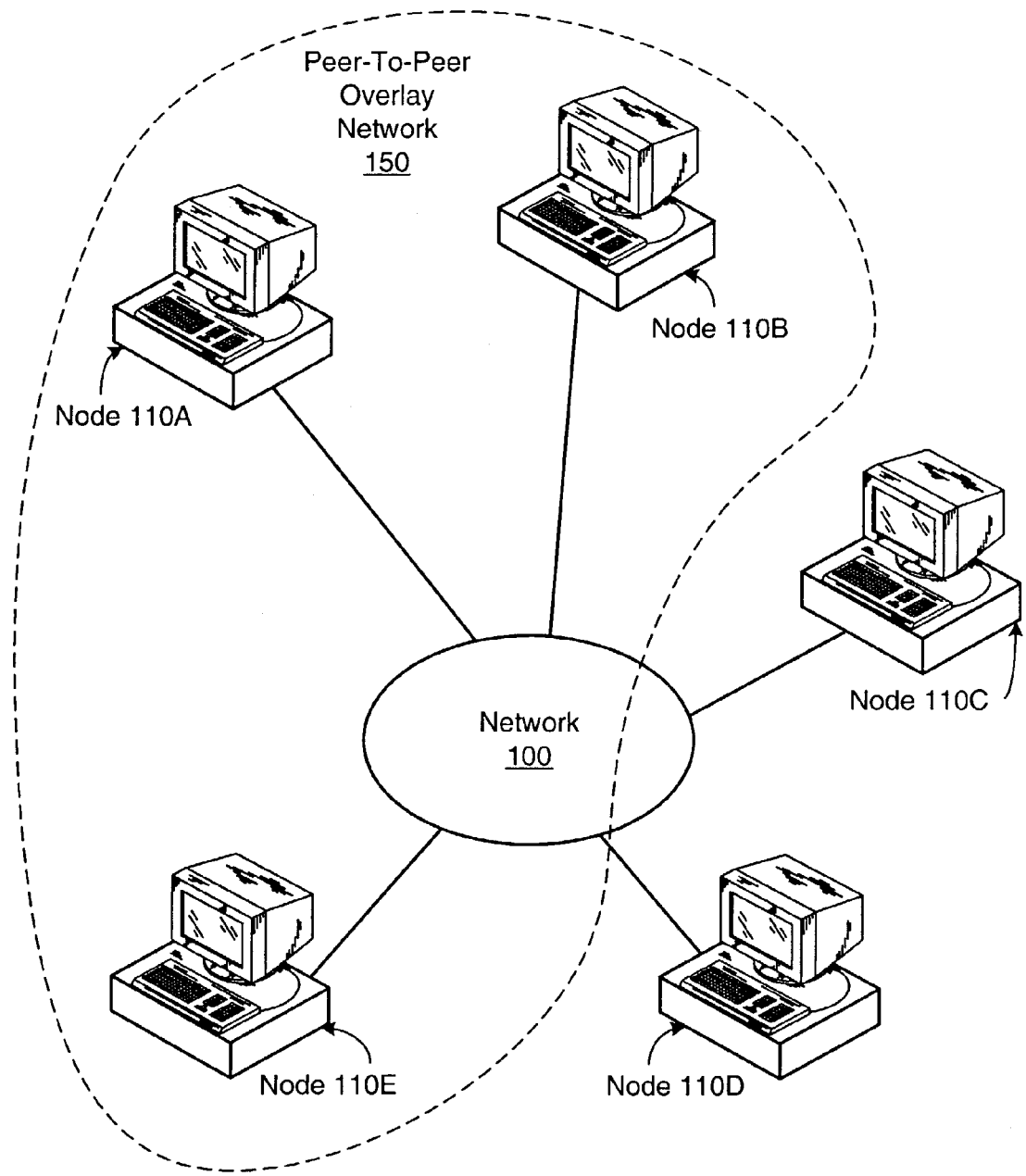
FIG. 2 is a diagram of a prior art peer-to-peer overlay network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 3:
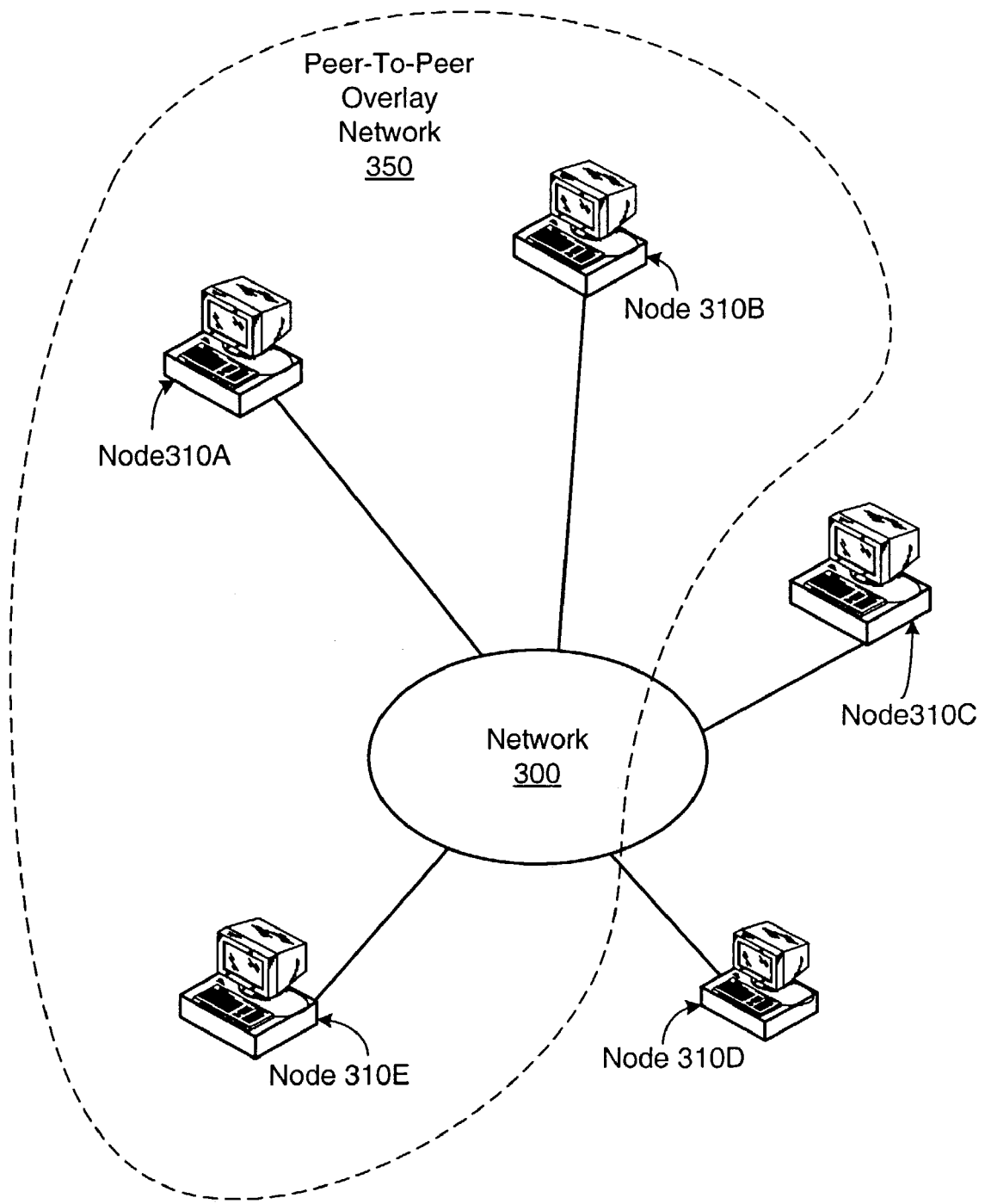
FIG. 3 is a diagram of one embodiment of a peer-to-peer overlay network.

Turning now to FIG. 3, a diagram of one embodiment of a peer-to-peer network including an overlay network. Peer-to-peer network 300 includes nodes 310A through 310E, although other embodiments are contemplated which include other numbers of nodes. Each of nodes 310A-E may communicate with each other through the network. However, a subset of the nodes (e.g., nodes 310A, 310B and 310E) forms a peer-to-peer overlay network 350, in which nodes 310A, 310B and 310E communicate with each other. It is noted that throughout this disclosure, drawing features identified by the same reference number followed by a letter (e.g., node 310A-310E) may be collectively referred to by that reference number alone (e.g., node 310) where appropriate.

The oval representing network 300 is representative of any local area network (LAN) or wide area network (WAN) using a variety of wired or wireless connection mediums. For example, wired mediums may include: a modem connected to plain old telephone service (POTS), Ethernet and fiber channel. Wireless connection mediums include a satellite link, a modem link through a cellular service or a wireless link such as Wi-Fi™, for example.

Regardless of the connection medium, any given network may exhibit certain properties associated with the use of the network. Thus, depending on the intended use of a particular overlay network, the topology of the overlay network may determine the network performance. Therefore, certain network information may be used to build an overlay network which may exhibit distinct properties associated with the overlay network's use. This network property is sometimes referred to as a small world network phenomenon. Thus, if a set of nodes comprising an overlay network all tend to exhibit similar properties, then that overlay network may also exhibit those same properties.

Accordingly, controlling the topology of the overlay network may increase performance. To control the topology in a p2p overlay network having no centralized information store and having no nodes which maintain global network state information, a set of characteristics may be identified and discovered for each node that may participate in the overlay network. This process is referred to as the discovery process. The discovery process may be applicable whether a given node (e.g., node 310D) is joining an existing p2p overlay network such as overlay network 350, for example, or whether the given node 310D is a first node and wishes to form an overlay network. In one embodiment, node 310D may broadcast a request for the set of characteristics. In another embodiment, node 310D may request information about all the nodes from one of the nodes in the overlay network. In yet another embodiment, node 310D may monitor network traffic to determine what nodes might be available to join.

Once the desirable characteristics have been identified, choosing to connect to nodes which exhibit those characteristics may determine the structure, characteristics and performance that a given overlay network may exhibit. As will be described in greater detail below in conjunction with the descriptions of FIG. 4 and FIG. 5, each node 310 may probabilistically choose to which nodes in an overlay network such as overlay network 350 it may be connected.

Figure 4:
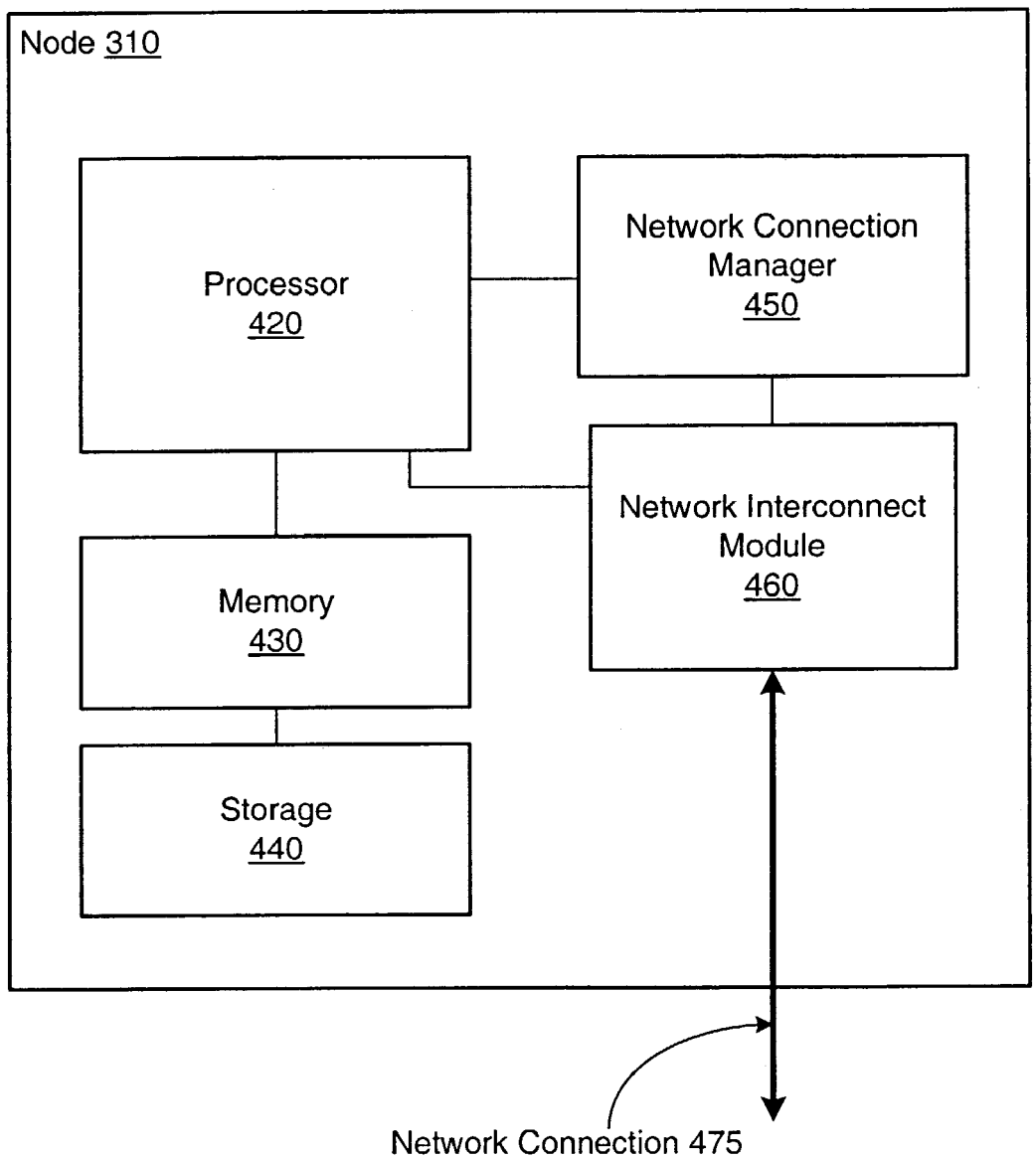
FIG. 4 is a diagram illustrating one embodiment of a node in a peer-to-peer overlay network.

Referring to FIG. 4, a diagram of one embodiment of a node in a peer-to-peer overlay network. Generally speaking node 310 may include various hardware and software components. In the illustrated embodiment, node 310 includes a processor 420 coupled to a memory unit 430 which is in turn coupled to a storage 440. Further, processor 420 is coupled to a network connection manager 450 and to a network interconnect module 460. Node 310 may be connected to a network such as network 300 of FIG. 3 via a network connection 475.

Processor 420 may be configured to execute instructions and to operate on data stored within memory 430. In one embodiment, processor 420 may operate in conjunction with memory 430 in a paged mode, such that frequently used pages of memory may be paged in and out of memory 430 from storage 440 according to conventional techniques. It is noted that processor 420 is representative of any type of processor. For example, in one embodiment, processor 420 may be compatible with the x86 architecture, while in another embodiment processor 420 may be compatible with the SPARC™ family of processors.

Memory 430 is configured to store instructions and data. In one embodiment, memory 430 may be implemented in various forms of random access memory (RAM) such as dynamic RAM (DRAM) or synchronous DRAM (SDRAM). However, it is contemplated that other embodiments may be implemented using other types of memory.

Storage 440 is configured to store instructions and data. Storage 440 may be an example of any type of mass storage device or system. For example, in one embodiment, storage 440 may be implemented as one or more hard disks configured independently or as a disk storage system. In one embodiment, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, storage 440 may include tape drives, optical storage devices or RAM disks, for example. It is noted that in addition to storage 440 being accessible by processor 420 through memory 430, it is contemplated that the contents of storage 440 may be accessible by other nodes in the overlay network.

Network interconnect module 460 may implement functionality to connect node 310 to a network such as network 300 of FIG. 3 via network connection 475. For example, network interconnect 460 may include a hardware layer and a software layer which controls the hardware layer. The software may be executable by processor 420 out of memory 430 to implement various network protocols such as TCP/IP and hypertext transport protocol (HTTP), for example.

Network connection manager 450 may implement functionality to control the interconnectivity of node 310 within an overlay network. As used herein, the term "network connection manager" broadly refers to software which when executed by processor 420 may probabilistically choose to which other nodes (if any), within an overlay network, node 310 will connect. Network connection manager 450 may support various specific network connection management functions, as described further below.

In one embodiment, network connection manager 450 may include functionality necessary to implement the discovery process as described above. For example, network connection manager 450 monitor network communications through network interconnect module 460 to gather information about other nodes in the network. In alternative embodiment, network connection manager 450 may gather information about other nodes connected to node 310 by querying the other nodes. The gathered information represents a set of attribute values and may include the type of hardware that each node has installed, the network connectivity of each node, the observed latency of each node in responding to a request, the observed bandwidth of each node, the number of stored objects and the number of peer connections each node has open, for example. It is noted that other embodiments may include additional information.

As will be described in greater detail below in conjunction with the description of FIG. 5, network connection manager 450 may further include functionality consistent with selecting a number of nodes with which to connect that have characteristics corresponding to the desired type of overlay network being created. Thus, the functionality may include scaling each of the attribute values to a value within a predetermined range. Scaling the values is sometimes referred to as normalizing. Each scaled value may be weighted according to how desirable a given attribute may be. The weighted scaled values of each node may then be summed to form a node rank value. Network connection manager 450 functionality may further include performing a selection function. For example, in one embodiment, the selection function may include generating a random number within the same predetermined range as the weighted scaled values and subsequently selecting a number of nodes having a node rank value larger than the random value. Network connection manager 450 may cause network interconnect module 460 to establish connections to the chosen nodes.

As will be described in greater detail below in conjunction with the description of FIG. 6, network connection manager 450 may further include functionality consistent with the selection function determining an arbitrary minimum rank value. To be considered for connection, a node must have a rank value greater than the minimum rank value. Further, of the nodes having a rank value greater than the minimum rank value, the selection function may choose with which of those nodes to connect at random. For example, there are ten possible nodes and six nodes have a rank value larger than the minimum rank value. However, in this example, the selection function may only connect to a predetermined maximum of four nodes. Thus, the selection function may generate a maximum node number by generating a random number between zero and four. The random number is used to determine to how many of the six nodes to connect. Assume for this example, that the selection function generates a random number of three (e.g., determines that it may connect to three nodes). Further, the selection function may now randomly choose to which three nodes of the six possible nodes to connect. The selection function may choose the three nodes by generating three random node numbers from the set of six possible nodes. It is noted that although the selection function described in this embodiment chooses from ten nodes, it is contemplated that the selection function may choose from any number of possible nodes. It is further contemplated that the arbitrary minimum rank value and the predetermined maximum may both be programmable values and may be dynamically changed as the network environment changes.

In one embodiment, network connection manager 450 may be implemented in Java™ programming language, although other embodiments are contemplated in which network connection manager 450 may be implemented in other programming languages.

Figure 5:
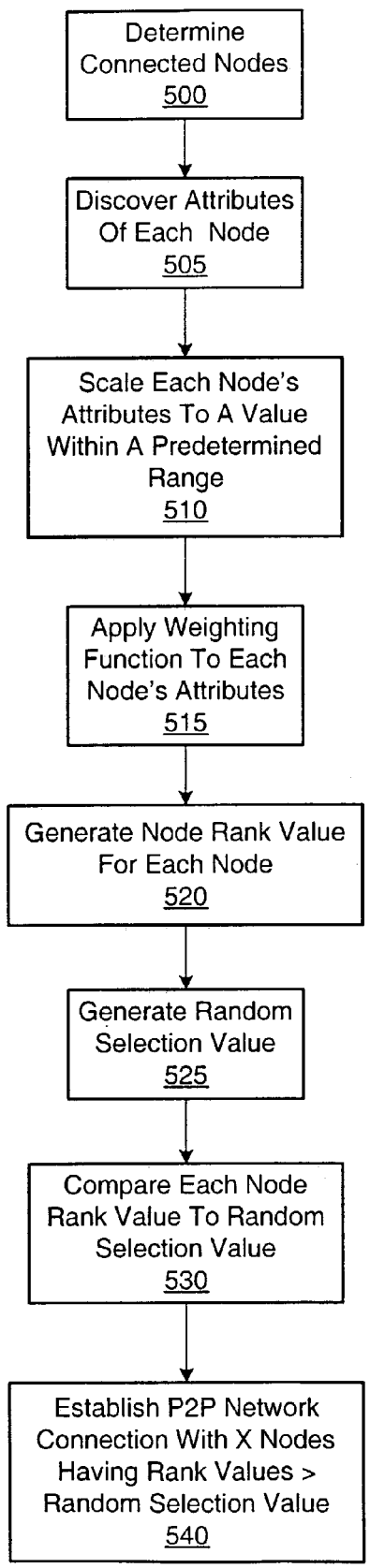
FIG. 5 is a flow diagram describing operation of one embodiment of a node in a peer-to-peer overlay network.

Turning to FIG. 5, a flow diagram describing the operation of one embodiment of a node in a peer-to-peer overlay network is shown. During creation of an overlay network, each node having a network connection manager such as network connection manager 450 of FIG. 4 may choose with which other nodes to connect dependent upon the characteristics of the other nodes in the network. Referring collectively to FIG. 4 and FIG. 5. Network connection manager 450 determines what other nodes are in the network (block 500) using any of a variety of techniques as described above. Network connection manager 450 gathers information about the other nodes during the discovery process (block 505). For example, network connection manager 450 may monitor communications between the other nodes in the network. Alternatively, network connection manager 450 may actively query various nodes for information. As described above, the information that network connection manager 450 gathers includes various node attributes such as bandwidth, installed hardware and storage capacity, for example.

Once the information is gathered, network connection manager 450 may quantify each attribute for further analysis. Accordingly, network connection manager 450 scales each attribute to a value within a predetermined range of values (block 510). In one embodiment, the range of values is between zero and one, inclusive, although other embodiments are contemplated in which the range of values may include any range as long as the range is the same for each attribute.

Network connection manager 450 applies a weighting function to each scaled attribute (block 515). The weighting function may multiply each scaled attribute value by a separate weighting factor which yields a weighted attribute value corresponding to each attribute. The weighting factor applied to each attribute may correspond to how important or desirable a particular attribute may be. For example, it may be more desirable for a node to have a given storage capacity than for a node to have a backup power supply. Accordingly, in that example, the storage capacity may be given more weight and thus may have a larger weighting factor. In one embodiment, each weighting factor may be a value in a range of values between zero and one, inclusive although other embodiments are contemplated in which the range may be any range. Therefore, in one embodiment, each resultant weighted attribute value will be within the range of values between zero and one, inclusive.

It is also noted that in alternative embodiments, a predetermined node rank value such as zero, for example may be assigned to a given node if that node is lacking in a critical resource. In this example, the selection function may be configured not to select nodes having a zero node rank value.

Network connection manager 450 generates a node rank value for each node by summing all the weighted attribute values of a given node (block 520). The resulting node rank values may be arranged into descending order. Network connection manager 450 generates a random selection value within the same predetermined range of values as the above range (block 525). In one embodiment, the range of values is between zero and one, inclusive although other embodiments are contemplated in which the range may be any range.

Network connection manager 450 compares the random selection value to each node rank value in the descending ordered list (block 530). Network connection manager 450 then selects a number of nodes having a node rank value which is greater than the random selection value. For example, a set of five nodes have node rank values of 0.85, 0.75, 0.65, 0.6 and 0.3. A random number having a value of 0.45 is generated. In one embodiment, the selection function may choose three nodes having values of 0.6, 0.65 and 0.75. Although other selection algorithms may be used. It is noted that, in other embodiments, the resulting node rank values may be arranged into ascending order and network connection manager 450 may select a number of nodes having a node rank value which is less than the random selection value. In one embodiment, the number of nodes chosen may be a dynamic value and may be changed depending upon variable network parameters. In alternative embodiments, the number of nodes chosen may be a fixed value. Network connection manager 450 may provide the connection information to network interconnect module 460 to establish connections to the chosen nodes (block 540).

Figure 6:
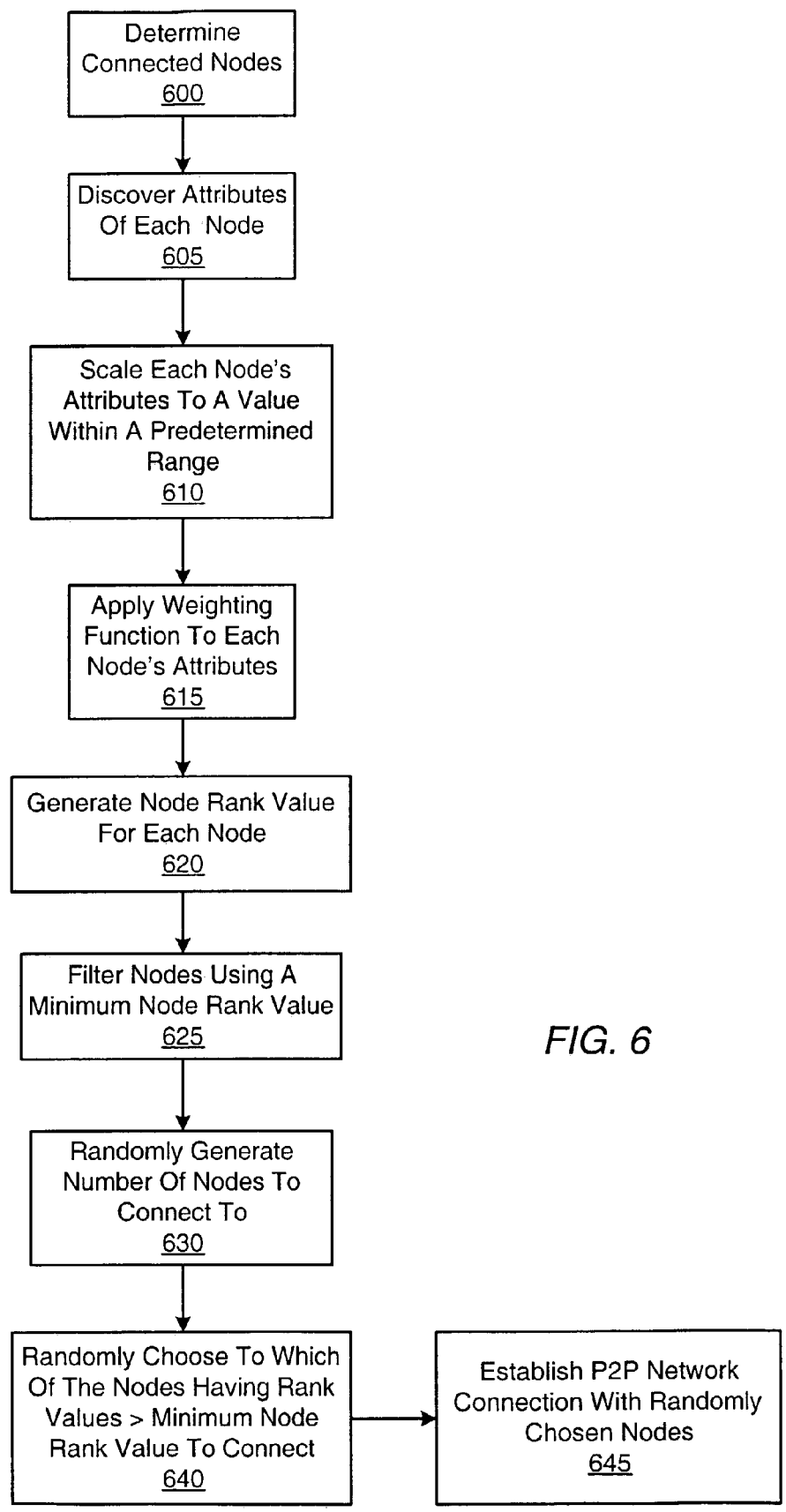
FIG. 6 is a flow diagram describing operation of another embodiment of a node in a peer-to-peer overlay network.

Referring to FIG. 6, a flow diagram describing the operation of another embodiment of a node in a peer-to-peer overlay network is shown. During creation of an overlay network, each node having a network connection manager such as network connection manager 450 of FIG. 4 may choose with which other nodes to connect dependent upon the characteristics of the other nodes in the network. Referring collectively to FIG. 4 and FIG. 6. Network connection manager 450 determines what other nodes are in the network (block 600) using any of a variety of techniques as described above. Network connection manager 450 gathers information about the other nodes during the discovery process (block 605). For example, network connection manager 450 may monitor communications between the other nodes in the network. Alternatively, network connection manager 450 may actively query various nodes for information. As described above, the information that network connection manager 450 gathers includes various node attributes such as bandwidth, installed hardware and storage capacity, for example.

Once the information is gathered, network connection manager 450 may quantify each attribute for further analysis. Accordingly, network connection manager 450 scales each attribute to a value within a predetermined range of values (block 610). In one embodiment, the range of values is between zero and one, inclusive, although other embodiments are contemplated in which the range of values may include any range as long as the range is the same for each attribute.

Network connection manager 450 applies a weighting function to each scaled attribute (block 615). The weighting function may multiply each scaled attribute value by a separate weighting factor which yields a weighted attribute value corresponding to each attribute. The weighting factor applied to each attribute may correspond to how important or desirable a particular attribute may be. For example, it may be more desirable for a node to have a given storage capacity than for a node to have a backup power supply. Accordingly, in that example, the storage capacity may be given more weight and thus may have a larger weighting factor. In one embodiment, each weighting factor may be a value in a range of values between zero and one, inclusive although other embodiments are contemplated in which the range may be any range. Therefore, in one embodiment, each resultant weighted attribute value will be within the range of values between zero and one, inclusive.

It is also noted that in alternative embodiments, a predetermined node rank value such as zero, for example may be assigned to a given node if that node is lacking in a critical resource. In this example, the selection function may be configured not to select nodes having a zero node rank value.

Network connection manager 450 generates a node rank value for each node by summing all the weighted attribute values of a given node (block 620). The resulting node rank values may be arranged into descending order. Network connection manager 450 uses an arbitrary minimum node rank value to filter out nodes having node rank values that are less than the minimum node rank value (block 625). The arbitrary minimum node rank value may be a predetermined value which may have been programmed into the node. In one embodiment, Network connection manager 450 may change the arbitrary minimum node rank value as network or node conditions change.

Network connection manager 450 randomly chooses with how many nodes to connect using a predetermined maximum node number. Network connection manager 450 generates a random number from zero to the predetermined maximum node number (block 630). Once the number of nodes has been selected, network connection manager 450 randomly chooses to which of the eligible nodes (e.g., having node rank values that are greater than the minimum node rank value) to connect (block 640). In one embodiment, network connection manager 450 generates random node numbers according to the selected number of nodes. For example, if nodes 2, 8, 11, 16 and 18 are eligible, and the selected number of nodes is three, network connection manager 450 may generate three random node numbers from the set of eligible nodes. Network connection manager 450 may provide the connection information to network interconnect module 460 to establish connections to the chosen nodes (block 645).

By utilizing a variable normalization and weighting scheme and a randomized selection processes as described above, a sizable overlay network may be created which may exhibit emergent global properties that reflect the chosen variables without relying on a central server or globalized knowledge.

It is noted that various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for creating from a network of existing nodes, a peer-to-peer overlay network having no centralized server, said method comprising:
    discovering a plurality of node characteristics for each node of a subset of said existing nodes;
    scaling each of said discovered plurality of node characteristics to a value which is within a predetermined range of values;
    generating a plurality of weighted values for each of said subset of existing nodes by applying a separate weighting function to each of said scaled values;
    generating a node rank value for each of said subset of existing nodes by summing said plurality of weighted values;
    determining which of said subset of said existing nodes are eligible nodes, wherein each of said eligible nodes have a node rank value that is greater than a dynamically programmable minimum node rank value;
    determining a maximum number of nodes of said eligible nodes to establish a connection by generating a random number between zero and a dynamically programmable maximum number;
    determining to which nodes of said eligible nodes to establish a connection by randomly selecting said maximum number of nodes from said eligible nodes; and
    establishing a connection to said selected nodes.

2. The method as recited in claim 1, wherein said predetermined range of values is zero to one, inclusive.

3. The method as recited in claim 1 further comprising generating a random value which is within said predetermined range of values for each of said subset of existing nodes, and modifying said dynamically programmable minimum node rank value with said random value during operation.

4. The method as recited in claim 3 further comprising selectively connecting to a given eligible node of said subset of existing nodes in response to determining that a node rank value corresponding to said given eligible node is greater than said random value.

5. The method as recited in claim 1, wherein applying a separate weighting function includes multiplying a respective predetermined weight associated with a given node characteristic with said scaled value corresponding to said given node characteristic.

6. The method as recited in claim 1, wherein said plurality of node characteristics includes a communication latency.

7. The method as recited in claim 1, wherein said plurality of node characteristics includes observed bandwidth.

8. The method as recited in claim 1, wherein said plurality of node characteristics includes available storage capacity.

9. The method as recited in claim 1, wherein discovering said plurality of node characteristics includes gathering said node characteristics by querying said subset of existing nodes.

10. The method as recited in claim 4, further comprising creating a grouping of possible nodes including all existing nodes having node rank value greater than said random value.

11. The method as recited in claim 10, further comprising randomly choosing to which nodes of said grouping of possible nodes to connect by generating a number of random node numbers from said grouping of possible nodes, wherein said number of random node numbers is indicated by said maximum node number.

12. A storage medium including program instructions executable by a processor to implement the method of:
discovering a plurality of node characteristics for each node of a subset of said existing nodes;
scaling each of said discovered plurality of node characteristics to a value which is within a predetermined range of values;
generating a plurality of weighted values for each of said subset of existing nodes by applying a separate weighting function to each of said scaled values;
generating a node rank value for each of said subset of existing nodes by summing said plurality of weighted values;
determining which of said subset of said existing nodes are eligible nodes, wherein each of said eligible nodes have a node rank value that is greater than a dynamically programmable minimum node rank value;
determining a maximum number of nodes of said eligible nodes to establish a connection by generating a random number between zero and a dynamically programmable maximum number;
determining to which nodes of said eligible nodes to establish a connection by randomly selecting said maximum number of nodes from said eligible nodes; and
establishing a connection to said selected nodes.

13. The storage medium as recited in claim 12, wherein said predetermined range of values is zero to one, inclusive.

14. The storage medium as recited in claim 12, wherein applying a separate weighting function includes multiplying a respective predetermined weight associated with a given node characteristic with said scaled value corresponding to said given node characteristic.

15. The storage medium as recited in claim 12, wherein said program instructions are further executable to generate a random value which is within said predetermined range of values for each of said subset of existing nodes, and to modify said dynamically programmable minimum node rank value with said random value during operation.

16. The storage medium as recited in claim 15, wherein said program instructions are further executable to selectively connect to a given eligible node of said subset of existing nodes in response to determining that a node rank value corresponding to said given eligible node is greater than said random value.

17. The storage medium as recited in claim 16, wherein said program instructions are further executable to create a grouping of possible nodes including all existing nodes having node rank value greater than said random value.

18. The storage medium as recited in claim 17, wherein said program instructions are further executable to randomly choose to which nodes of said grouping of possible nodes to connect by generating a number of random node numbers from said grouping of possible nodes, wherein said number of random node numbers is indicated by said maximum node number.

19. A computer system comprising:
a plurality of nodes interconnected via a network, wherein each of said plurality of nodes includes:
a processor; and
a memory coupled to said processor, said memory including program instructions executable by the processor to:
create from a subset of nodes of said plurality of nodes, a peer-to-peer overlay network having no centralized server
discover a plurality of node characteristics for each node of a subset of said existing nodes;
scale each of said discovered plurality of node characteristics to a value which is within a predetermined range of values;
generate a plurality of weighted values for each of said subset of existing nodes by applying a separate weighting function to each of said scaled values;
generate a node rank value for each of said subset of existing nodes by summing said plurality of weighted values;
determine which of said subset of said existing nodes are eligible nodes, wherein each of said eligible nodes have a node rank value that is greater than a dynamically programmable minimum node rank value;
determine a maximum number of nodes of said eligible nodes to establish a connection by generating a random number between zero and a dynamically programmable maximum number;
determine to which nodes of said eligible nodes to establish a connection by randomly selecting said maximum number of nodes from said eligible nodes; and
establish a connection to said selected nodes.

20. The computer system as recited in claim 19, wherein the program instructions are further executable by the processor to generate a random value which is within said predetermined range of values for each of said subset of nodes, and to modify said dynamically programmable minimum node rank value with said random value during operation.

21. The computer system as recited in claim 20, wherein the program instructions are further executable by the processor to selectively connect to a given eligible node of said plurality of nodes in response to determining that a node rank value corresponding to said given eligible node is greater than said random value.

22. A computer system comprising:
a plurality of nodes interconnected via a network, wherein each of said plurality of nodes includes:
a processor;
a memory coupled to said processor and configured to store instructions and data; and a network connection manager coupled to said processor and configured to create from a subset of nodes of said plurality of nodes, a peer-to-peer overlay network having no centralized server, wherein the network connection manager is further configured to:

discover a plurality of node characteristics for each node of a subset of nodes of said plurality of nodes;

scale each of said discovered plurality of node characteristics to a value which is within a predetermined range of values;

generate a plurality of weighted values for each of said subset of nodes by applying a separate weighting function to each of said scaled values;

generate a node rank value for each of said subset of nodes by summing said plurality of weighted values;

determine which of said subset of said nodes are eligible nodes, wherein each of said eligible nodes have a node rank value that is greater than a dynamically programmable minimum node rank value;

determine a maximum number of nodes of said eligible nodes to establish a connection by generating a random number between zero and a dynamically programmable maximum number;

determine to which nodes of said eligible nodes to establish a connection by randomly selecting said maximum number of nodes from said eligible nodes; and establish a connection to said selected nodes.

23. A computer system comprising:

means for discovering a plurality of node characteristics for each of a subset of nodes of a plurality of nodes of a network;

means for scaling each of said discovered plurality of node characteristics to a value which is within a predetermined range of values;

means for generating a plurality of weighted values for each of said subset of nodes by applying a separate weighting function to each of said scaled values;

means for generating a node rank value for each of said subset of nodes by summing said plurality of weighted values;

means for determining which of said subset of said existing nodes are eligible nodes, wherein each of said eligible nodes have a node rank value that is greater than a dynamically programmable minimum node rank value;

means for determining a maximum number of nodes of said eligible nodes to establish a connection by generating a random number between zero and a dynamically programmable maximum number;

means for determining to which nodes of said eligible nodes to establish a connection by randomly selecting said maximum number of nodes from said eligible nodes; and means for establishing a connection to said selected nodes.

24. The method as recited in claim 1, wherein discovering said set of node characteristics includes gathering said node characteristics by monitoring network traffic by monitoring communications between different nodes.

25. The method as recited in claim 1, wherein said set of node characteristics includes availability of a node backup power supply.

26. The method as recited in claim 1, further comprising modifying said dynamically programmable minimum node rank value during operation as an environment corresponding to said network of existing nodes changes.

27. The method as recited in claim 1, further comprising modifying said dynamically programmable maximum number during operation as an environment corresponding to said network of existing nodes changes.

28. The method as recited in claim 1, further comprising assigning to a given node a node rank value of zero in response to determining the given node does not include a specific characteristic.

* * * * *